(12) United States Patent
Masaki et al.

(10) Patent No.: US 7,589,792 B2
(45) Date of Patent: Sep. 15, 2009

(54) BROADCASTING SIGNAL RECEIVING SYSTEM INCLUDING VIEWING IMPROVEMENT CONTROL PART

(75) Inventors: Yasuo Masaki, Osaka (JP); Tomohiko Sawanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 706 days.

(21) Appl. No.: 11/284,556

(22) Filed: Nov. 22, 2005

(65) Prior Publication Data

US 2006/0242662 A1 Oct. 26, 2006

(30) Foreign Application Priority Data

Nov. 22, 2004 (JP) ............................ 2004-338125

(51) Int. Cl.
*H04N 5/44* (2006.01)
(52) U.S. Cl. ...................................... 348/553
(58) Field of Classification Search ................ 348/552, 348/553, 725; 725/25, 28, 29, 12
See application file for complete search history.

(56) References Cited

U.S. PATENT DOCUMENTS

| | | | |
|---|---|---|---|
| 5,758,257 A * | 5/1998 | Herz et al. | 725/116 |
| 6,002,427 A * | 12/1999 | Kipust | 348/156 |
| 7,134,130 B1 * | 11/2006 | Thomas | 725/25 |
| 2002/0199188 A1 * | 12/2002 | Sie et al. | 725/35 |
| 2004/0221303 A1 * | 11/2004 | Sie et al. | 725/29 |

FOREIGN PATENT DOCUMENTS

| | | |
|---|---|---|
| JP | 2001-016514 | 1/2001 |
| JP | 2001-136463 | 5/2001 |
| JP | 2001-333030 | 11/2001 |
| JP | 2002-118769 | 4/2002 |
| JP | 2004-120049 | 4/2004 |
| WO | WO-2004/004342 A1 | 1/2004 |

OTHER PUBLICATIONS

Japanese Office Action for Japanese Application No. 2004-338125, mailed on May 30, 2007, with English translation thereof (3 pages).

(Continued)

*Primary Examiner*—Paulos M Natnael
(74) *Attorney, Agent, or Firm*—Osha • Liang LLP

(57) ABSTRACT

A broadcasting signal receiving system includes: an obtaining part for obtaining program information of a receiving program; a broadcasting signal receiving part for receiving a broadcasting signal to obtain a video signal and an audio signal or a recorded image reproducing part for reproducing a previously recorded program to obtain a video signal and an audio signal; an image pick-up part for recording an image of a viewer; a certifying part for comparing the image with the previously registered image of a face of an individual to certify the viewing individual; an illumination intensity detecting part for detecting the brightness of a viewing space; and a viewing improvement control part for controlling the improvement of viewing on the basis of the certified result by the certifying part, a kind of the receiving program and the illumination intensity of the viewing space.

9 Claims, 3 Drawing Sheets

OTHER PUBLICATIONS

Patent Abstracts of Japan for Japanese Publication No. 2004-120049, Publication date Apr. 15, 2004 (2 pages).
Patent Abstracts of Japan for Japanese Publication No. 2001-136463, Publication date May 18, 2001 (2 pages).
Patent Abstracts of Japan for Japanese Publication No. 2002-118769, Publication date Apr. 19, 2002 (2 pages).
Patent Abstracts of Japan for Japanese Publication No. 2001-016514, Publication date Jan. 19, 2001 (2 pages).
Patent Abstracts of Japan, Publication No. 2001-333030, dated Nov. 30, 2001 (2 pages).
Patent Abstracts of Japan, Publication No. 2001-016514, dated Jan. 19, 2001 (2 pages).

* cited by examiner

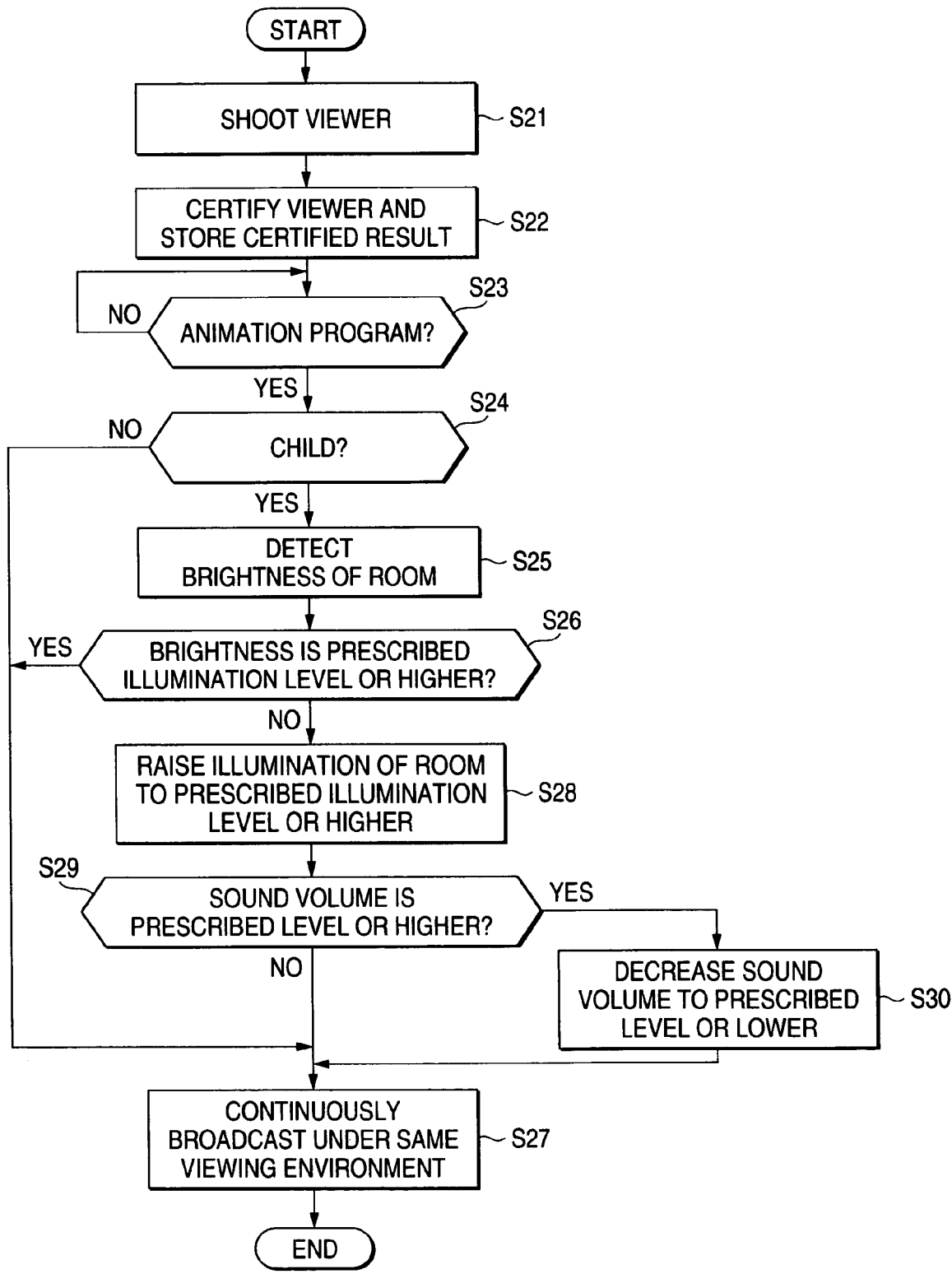

BROADCASTING SIGNAL RECEIVING SYSTEM INCLUDING VIEWING IMPROVEMENT CONTROL PART

BACKGROUND OF THE INVENTION

1. Field of the Invention

The present invention relates to a broadcasting signal receiving system, and more particularly to a broadcasting signal receiving system on which a protecting function is installed for preventing a hypersensitivity to light that is apt to occur in such a case that infants view an animated program in a dark place.

2. Description of the Related Art

Usually, a technique wherein information such as a video or an audio and a character is broadcast or distributed by an analog system, or a digital system has been provided and a device for receiving this information, and having various functions added has been proposed (for instance, see JP-A-2001-333030 and JP-A-2001-16514).

JP-A-2001-333030 discloses a broadcasting program transmitting and receiving system for controlling peripheral devices such as an air conditioner or an illuminating device in accordance with the contents of a broadcasting program. For instance, when a scene appears in the broadcasting program in which the brightness of a room needs to be adjusted (for instance, a horror scene in which a ghost or a monster appears), the illuminating light of a lamp is controlled to be dark or turned off so as to meet the program data of the scene. Further, JP-A-2001-16514 discloses a device that recognizes a viewer and switches a channel, gives a warning or turns off a power source, when the viewer is an infant or a child and a scene is displayed that gives an educationally bad influence to the viewer.

SUMMARY OF THE INVENTION

According to the system disclosed in JP-A-2001-333030, an exciting viewing environment can be provided to the viewer. Further, in the device disclosed in JP-A-2001-16514, when the viewer is an infant or a child, a program that gives the educationally undesirable effect to the viewer can be limited.

However, both the related arts do not consider a prevention of a hypersensitivity to light that is likely to occur when a child views an animated program in a dark place. As for the hypersensitivity to light for children, production companies for producing animations provide a fixed standard to produce the animations. However, since viewing environments are different in homes respectively, a hypersensitivity to light for the children cannot be completely prevented solely by the countermeasure of the production companies for producing the animations.

The present invention is proposed by considering the above-described problems and it is an object of the present invention to provide a broadcasting signal receiving system on which a protecting function is installed for preventing the generation of a hypersensitivity to light that is apt to occur in such a case where infants view an animated program in a dark place.

A broadcasting signal receiving system of the present invention comprises: an obtaining part for obtaining the program information of a receiving program; a broadcasting signal receiving part for receiving a broadcasting signal to obtain a video signal; an audio signal or a recorded image reproducing part for reproducing a previously-recorded program to obtain a video signal and an audio signal; an image pickup part for recording the image of a viewer; a certifying part for comparing the image of the face of the viewer recorded by the image pickup part with the previously registered image of the face of an individual to certify the viewing individual; an illumination intensity detecting part for detecting the brightness of a viewing space; and, a viewing improvement control part for controlling the improvement of viewing on the basis of the certified result by the certifying part, a kind of receiving program based on program information, or a kind of reproduced program and the illumination intensity of the viewing space by the illumination intensity detecting part. In this case, since a camera as the image pickup part ordinarily has a function for detecting the brightness of an object to be shot, the camera as the image pickup part may be also used as the illumination intensity detecting part.

When three conditions are satisfied that the certified result by the certifying part designates a predetermined child, the kind of receiving program is an animated program and the illumination intensity of the viewing space detected by the illumination intensity detecting part is not higher than a preset illumination level, the viewing improvement control part performs a control of the improvement of viewing. Here, the control of the improvement of viewing specifically indicates a control including a warning process for displaying a message to make the illumination of a room brighter on a monitor screen. As an environment for viewing the animated program, when the illumination is dark, a warning for making the illumination of the room brighter is displayed on the monitor screen. Thus, for instance, when a parent is present there, the parent noticing the warning can immediately change the viewing environment by making the illumination of the room brighter.

Further, the broadcasting signal receiving system of the present invention further comprises a control signal transmitting part for transmitting a control signal for controlling an illumination intensity to an illuminating device disposed in the viewing space. When the illumination intensity of the illuminating device is not higher than a preset illumination level, the viewing improvement control part may, as the control of the improvement of viewing, adjust the control signal to be transmitted to the illuminating device so as to raise the illumination intensity of the illuminating device to the preset illumination level. As a control for raising the illumination intensity of the illuminating device to the preset illumination level, a control is also included for simply turning on (turn on the power) the illuminating device that is turned off. Further, since a recent illuminating device includes such a device whose brightness is changed in a step-less way, this kind of illuminating device can control the illumination intensity thereof to be raised to the preset illumination level. As described above, the individual is certified by the certifying part so that the viewer can be automatically specified and the brightness of the room during viewing the program that has been usually controlled by the protector can be controlled even when the protector is not present.

Still further, as the control of the improvement of viewing, when a sound volume exceeds a preset sound volume level, the viewing improvement control part may adjust the sound volume to be lowered to the preset sound volume level. Generally, infants or children of the lower classes of an elementary school frequently view a broadcasting program by raising the sound volume. In this case, from the viewpoint of a hypersensitivity to light, the sound volume seems to be hardly related to the hypersensitivity to light. However, in a sense of stimulating the brain of a child, as the sound volume grows large, the brain of the child is more stimulated as in the case of the hypersensitivity to light. Therefore, even if the sound volume is not a direct cause of the hypersensitivity to light, in a sense of reducing the stimulation to the brain of the child, not only the illumination is made to be brighter, but also the sound volume is lowered, so that factors for causing the hypersensitivity to light can be anticipated to be reduced.

Still further, the broadcasting signal receiving system of the present invention may further comprise a communication part for performing a unidirectional communication or a bi-directional communication with other electronic devices through a communication line. Then, when three conditions are satisfied that the certified result by the certifying part designates a predetermined child, the kind of receiving program is an animated program and the illumination intensity of the viewing space detected by the illumination intensity detecting part is not higher than a preset illumination level, the viewing improvement control part may transmit a message for making the illumination of the room brighter to other electronic devices through the communication line. In this case, other electronic devices may include a personal computer, a portable telephone, a PDA or a television receiver disposed in another room of the building. Especially, even when the parent goes out, the parent usually often carries the portable telephone. Thus, the portable telephone is informed of the state of a viewing environment of the child, so that even when the parent goes out, the parent can instruct the child to make the illumination of the room brighter by calling home on the phone.

According to the broadcasting signal receiving system of the present invention, the individual is certified by the certifying part so that the viewer can be automatically specified and the brightness of the room during viewing the program that has been usually controlled by the protector can be controlled even when the protector is not present. Thus, the generation of a hypersensitivity to light can be prevented that is apt to occur in such a case that infants view an animated program in a dark place.

BRIEF DESCRIPTION OF THE DRAWINGS

These and other objects and advantages of this invention will become more fully apparent from the following detailed description taken with the accompanying drawings in which:

FIG. 3 is a flowchart showing a viewing improvement control process according to an embodiment 2 of the broadcasting receiving system of the present invention.

DETAILED DESCRIPTION OF THE PREFERRED EMBODIMENTS

Now, embodiments of the present invention will be described with reference to the drawings.

Figure 1:
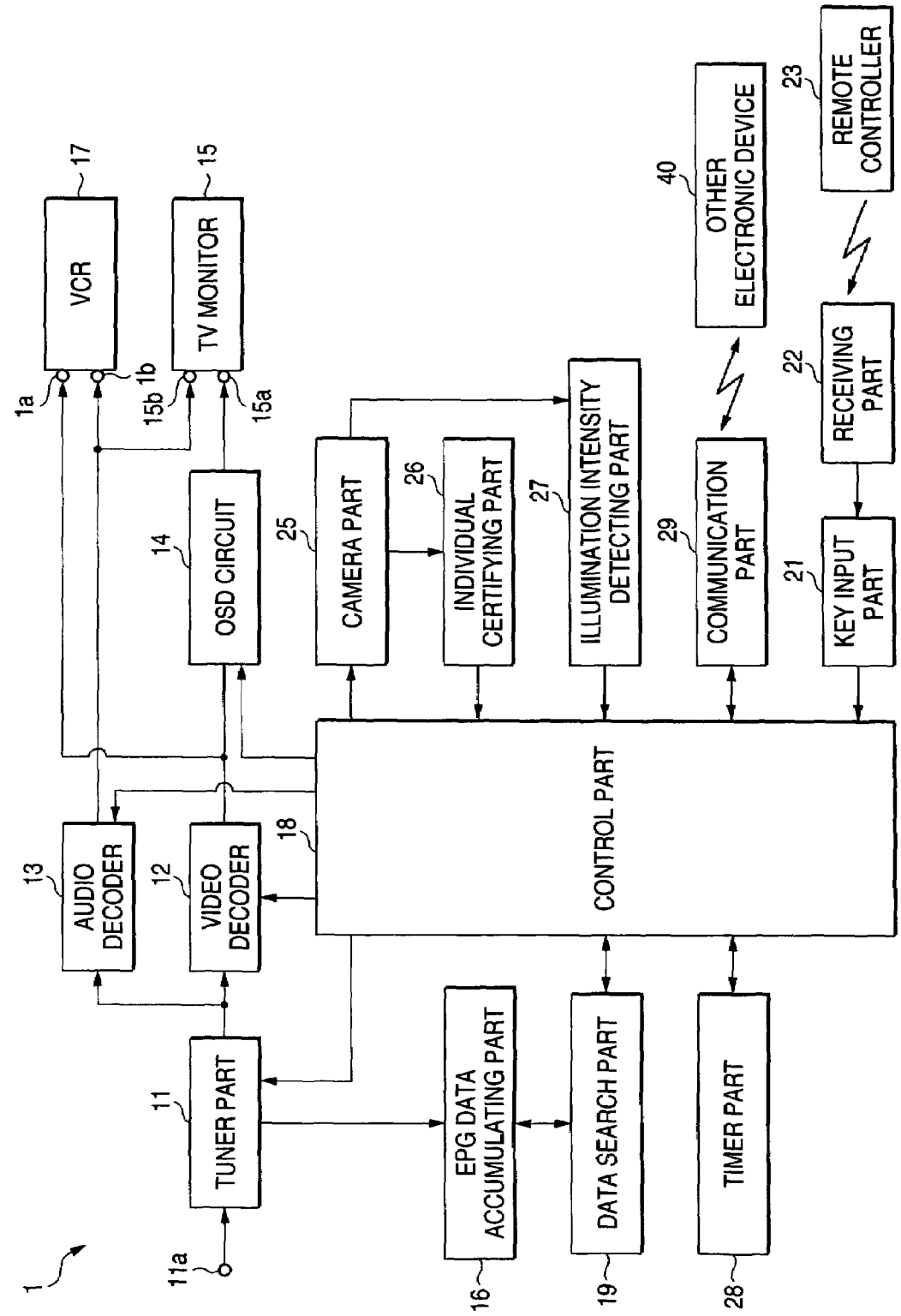
FIG. 1 is a functional block diagram showing the entire structure of a broadcasting signal receiving system of the present invention.

FIG. 1 is a functional block diagram showing the entire structure of a broadcasting signal receiving system of the present invention.

A broadcasting signal receiving system 1 includes an input terminal 11a for inputting a broadcasting signal received by an antenna not shown in the drawing and a tuner part 11 is connected to the input terminal 11a. An output of the tuner part 11 is connected to a video decoder 12 for converting a digital video signal to an analog video signal and connected to an audio decoder 13 for converting a digital audio signal to an analog audio signal. Further, the output of the video decoder 12 is connected to a video input and output terminal 1a of a VCR (video cassette recorder) 17 and to a video input terminal 15a of a TV monitor 15 through an OSD (on screen display) circuit 14. Further, the output of the audio decoder 13 is connected to an audio input terminal 15b of the TV monitor 15 and to an audio input and output terminal 1b of the VCR 17.

The output of the tuner part 11 is connected to an EPG data accumulating part (RAM or EEPROM) 16 for temporarily accumulating the latest electronic program guide (EPG) data included in the received broadcasting signal.

A control part 18 is composed of a CPU, a ROM, a RAM or the like whose illustrations are omitted and controls the tuner part 11, the video decoder 12, the audio decoder 13 and the OSD circuit 14, respectively. Further, to the control part 18, a data search part 19 for searching the EPG data accumulated in the EPG data accumulating part 16 is bi-directionally connected. The control part 18 controls the data search part 19 at a suitable timing to search the EPG data accumulated in the EPG data accumulating part 16.

Further, to the control part 18, a key input part 21 is connected for inputting various kinds of key operating signals to the control part 18. To the key input part 21, an output of a receiving part 22 is connected for receiving a key operating signal from a remote controller 23. That is, the key input part 21 not only inputs the operating signals of various kinds of keys (buttons) provided on a front surface panel of a device main body to the control part 18, but also inputs the key operating signal from the remote controller 23 received by the receiving part 22 to the control part 18. Further, to the control part 18, a below-described timer part 28 for measuring a prescribed time is connected.

In the device main body, a camera part (CCD camera part) 25 as a shooting part for shooting a viewer is provided. The output of the camera part 25 is connected to an individual certifying part 26 for certifying an individual on the basis of a shot image and an illumination intensity detecting part 27 for detecting a viewing environment of a room, that is, the brightness of a room on the basis of the shot image. A certified result in the individual certifying part 26 and the illumination intensity information of the room by the illumination intensity detecting part are inputted to the control part 18.

Further, a communication part 29 that can perform a unidirectional communication or a bi-directional communication with other electronic devices 40 is connected to the control part 18. For example, when other electronic devices are domestic electric products and the electric products are connected together by a network (domestic LAN), the communication part 29 serves as a communication part to be connected to the network. For instance, when the electronic device is a portable telephone, the communication part 29 serves as a communication part to be connected to a portable telephone network. Here, the domestic electric products include, for instance, kitchen equipment such as a refrigerator, a microwave range and AV devices such as a television receiver disposed in other rooms and illumination devices respectively disposed in rooms. For embodiment, when the illumination device is connected to the control part through the communication part 29, the illumination device can be controlled to be turned on and off, or the brightness of the room can be adjusted by changing the illuminating light.

In the above-described structure, in the individual certifying part 26, information showing the physical features of all the members of a family (only the information of infants or children may be stored) is previously stored in an inner memory not shown in the drawing. As a storing method of the information, for instance, a menu button of the remote controller 23 (not shown) is operated to select a register mode of recognizing information. The register mode of the recognizing information means a mode for storing the feature information of an object to be shot that is recognized by the individual certifying part 26.

Specifically explained, for instance, when the recognizing data of a child is formed, the face of the child is shot with a distance spaced that is designated from the camera part 25. The individual certifying part 26 forms child recognizing data on the basis of the shot image of the face. Since an image recognizing technique is usually known, a detailed description thereof is omitted herein. The child recognizing data (feature data) is stored in the inner memory. The individual certifying part 26 subsequently certifies a specific individual on the basis of the certifying data stored in the inner memory.

In this embodiment, the illumination intensity detecting part 27 detects the brightness of the room (illumination level) on the basis of an image shot by the camera part 25. However, an illumination intensity detecting part for detecting only the brightness of a room may be provided separately from the camera part 25. Since the detection of the illumination intensity is a known technique, a detailed description thereof will be omitted herein.

The control part 18 performs the control of an improvement of viewing in accordance with a certified result by the individual certifying part 26, a kind of a receiving program based on the EPG data accumulated in the EPG data accumulating part 16 and the illumination intensity of a viewing space by the illumination intensity detecting part 27. Now, specific embodiments of the control of the improvement of viewing will be described below.

Figure 2:
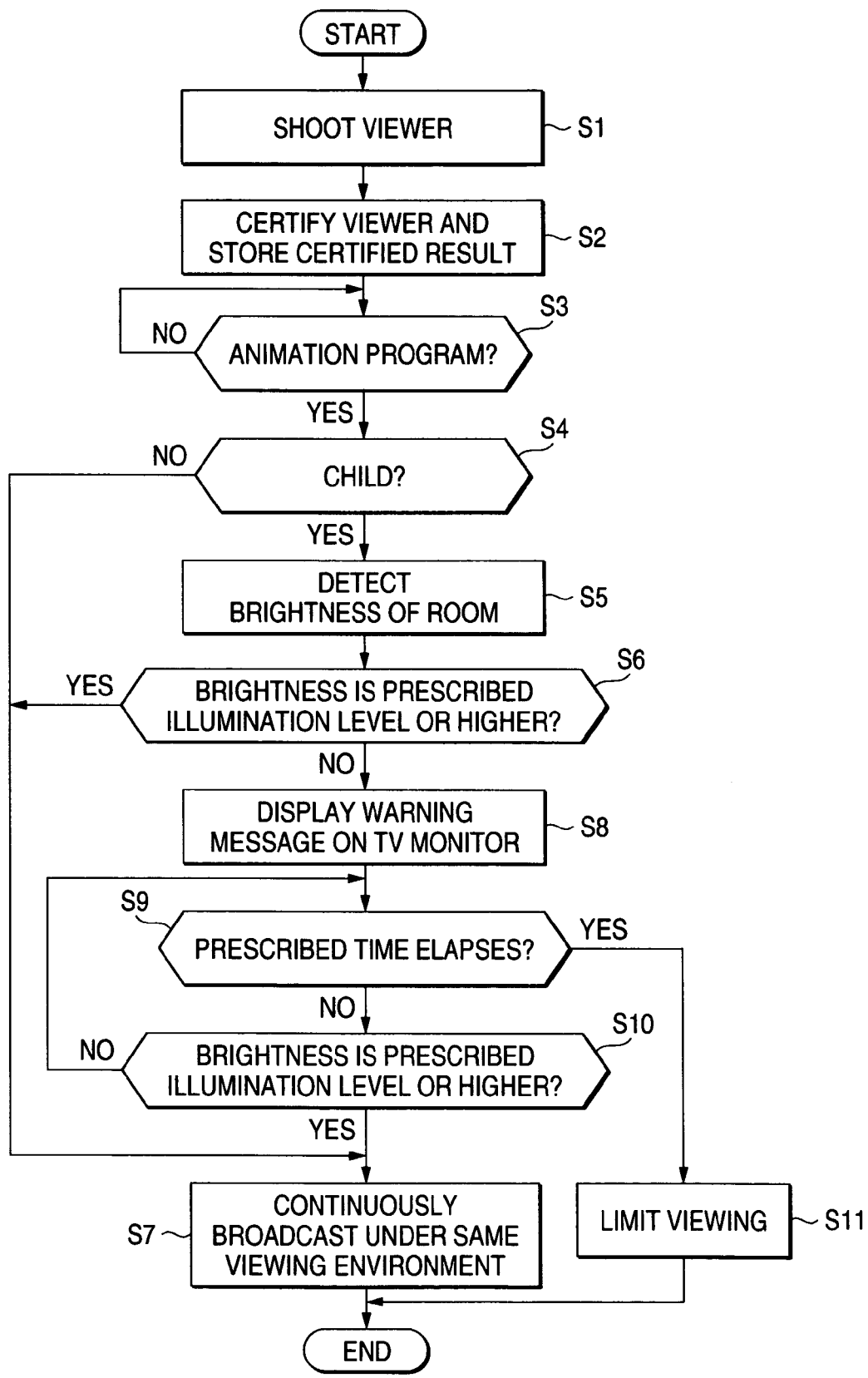
FIG. 2 is a flowchart showing a viewing improvement control process according to an embodiment 1 of the broadcasting receiving system of the present invention.

FIG. 2 is a flowchart showing a viewing improvement control process of an embodiment 1. Now, referring to this flowchart, the procedure of the viewing improvement control of the embodiment 1 will be described below.

For instance, when the power of a television is turned on by the remote controller 23, the control part 18 controls the camera part 25 to shoot a viewer (step S1). The individual certifying part 26 compares the image of the face of the viewer shot by the camera part 25 with the image of the face of the child previously registered in the inner memory to certify the viewer and store the certified result in the inner memory not shown in the drawing (step S2).

Under this state, the control part 18 searches the EPG data accumulating part 16 by the data search part 19 to decide whether or not a currently-received broadcasting program or a reproduced program by the VCR 17 is an animated program (step S23). This decision is carried out, for instance, when the power of the television is turned on by the remote controller 23, during the reproducing operation of the VCR 17 or during switching the channel of the received broadcasting program. As a result, when the currently-received broadcasting program or the currently reproduced program is the animated program (when it is decided to be "Yes" in step S23), then, the certified result stored in the inner memory decides whether or not the certified viewer is a child (step S24). As a result, when the viewer is not the child (when it is decided to be "No" in step S24), an operation is moved to step S27 to continuously broadcast the animated program as it is.

On the other hand, when the viewer is a child (when it is decided to be "Yes" in step S4), then, the brightness of the room as the viewing space is detected by the illumination intensity detecting part 27 (step S5) and decides whether or not the brightness of the room is a preset and prescribed illumination level (level of brightness under which even when the child views the animated program, the child does not seem to have a hypersensitivity to light) or higher (step S6).

Consequently, when the brightness of the room is not lower than the prescribed illumination level (when it is decided to be "Yes" in step S6), a viewing state is continuously kept (step S7).

On the other hand, when the brightness of the room is not higher than the prescribed illumination level (when it is decided to be "No" in step S6), a message for making the illumination brighter is displayed on the screen of the TV monitor 15 (step S8). Further, the control part 18 starts to measure a preset and prescribed time (for instance, one minute) by the timer part 28 (step S9) to decide whether or not the illumination of the room is made to be brighter during the measurement, that is, whether or not the brightness of the room is adjusted to the prescribed illumination level, or higher (step S10). Then, when the illumination of the room is made to be brighter before the prescribed time elapses (when it is decided to be "No" in step S9 and "Yes" in step S10), the message displayed, together with an animated image on the screen of the TV monitor 15, is erased to move to the step S7 and continuously broadcast the animated program.

On the other hand, the illumination of the room is not brightened even when a prescribed time elapses (when it is decided to be "Yes" in step S9), if the control part 18 decides that a viewing environment is not improved to limit a viewing (step S11). Here, a viewing limiting control may be exemplified as a control that forcibly turns off the power of the TV, or a control that forcibly switches the receiving channel to a program other than the animated program.

In the embodiment 1, the viewing control is carried out when prescribed conditions are satisfied, and processes are completed independently by the system. However, in an embodiment 2, a viewing environment is automatically improved and a device is connected to a domestic LAN through the communication part 29. Now, the procedure of a viewing improvement control of the embodiment 2 will be described below by referring to a flowchart shown in FIG. 3.

For instance, when a power is turned on by the remote controller 23, the control part 18 controls the camera part 25 to shoot a viewer (step S21). The individual certifying part 26 compares the image of the face of the viewer shot by the camera part 25 with the image of the face of the child previously registered in the inner memory to certify the viewer and store the certified result in the inner memory not shown in the drawing (step S22).

Under this state, the control part 18 searches the EPG data accumulating part 16 by the data search part 19 to decide whether or not a currently received broadcasting program or a reproduced program by the VCR 17 is an animated program (step S23). This decision is carried out, for instance, when the power of the television is turned on by the remote controller 23, during the reproducing operation of the VCR 17 or during switching the channel of the received broadcasting program. As a result, when the currently received broadcasting program or the currently reproduced program is the animated program (when it is decided to be "Yes" in step S23), then, the certified result stored in the inner memory decides whether or not the certified viewer is a child (step S24). As a result, when the viewer is not the child (when it is decided to be "No" in step S24), an operation is moved to step S27 to continuously broadcast the animated program as it is.

On the other hand, when the viewer is a child (when it is decided to be "Yes" in step S24), then, the brightness of the room as the viewing space is detected by the illumination intensity detecting part 27 (step S25) and decides whether or not the brightness of the room is a preset and prescribed illumination level (level of brightness under which even when a child views the animated program, the child does not seem to have a hypersensitivity to light) or higher (step S26). Consequently, when the brightness of the room is not lower than the prescribed illumination level (when it is decided to be "Yes" in step S26), a viewing state is continuously kept (step S27).

On the other hand, when the brightness of the room is not higher than the prescribed illumination level (when it is decided to be "No" in step S26), the brightness of the illuminating device in the room is adjusted through the communication part 29 and the illumination in the room is set to the prescribed illumination level or higher (step S28). At this time, the control part 18 detects a sound volume transmitted from the TV monitor 15 and decides whether or not the sound volume is a preset and prescribed sound volume level or higher (step S29). As a result, when the sound volume is not higher than the prescribed sound volume level (when it is decided to be "No" in step S29), the operation is shifted to step S27 to continuously perform a viewing under the same sound volume level. On the other hand, when the sound volume exceeds the prescribed sound volume level (when it is decided to be "Yes" in step S29), a volume is adjusted so as to lower the sound volume to the prescribed sound volume level or lower (step S30), and then, the operation is shifted to step S27 to continuously view the program under the adjusted sound volume level.

In the above-described embodiment 2, both the control of the illumination of the room and the control of the sound volume are simultaneously carried out in association with each other. However, only when the illumination of the room is assuredly controlled, the sound volume may not be necessarily controlled. Further, in the embodiment 2, the system is connected to the domestic LAN through the communication part 29. Accordingly, for instance, when a personal computer is connected to the domestic LAN and warning information is transmitted to the personal computer from the system, a message can be transmitted or the illumination of the room can be controlled in accordance with the decision of the personal computer side.

In the above-described embodiment 2, the system of the present invention is connected to the domestic LAN through the communication part 29. In an embodiment 3, a communication is carried out with a portable communication terminal (for instance, a portable telephone) through the communication part 29. In the processes of the embodiment 3, a communication with the portable telephone is basically added to the processes of the embodiment 1. Here, only the process of the added part will be described.

Namely, in the embodiment 3, a process corresponding to step S8 in the procedure of embodiment 1 shown in FIG. 2 is different from that of embodiment 1.

In the step S8 of the embodiment 1, only the message for making the illumination of the room brighter is displayed on the screen of the TV monitor 15. However, in the embodiment 3, a message having the same meaning as that of the above message is transmitted to the portable telephone possessed by, for instance, a parent through the communication part 29. As the message at this time, for instance, such a warning message may be employed that children are going to see a television in a dark room. In this case, the contents of the message may be previously set. The message may be set by the parent or previously registered. Thus, even when the parent goes out, the parent can instruct the children to brighten the illumination of the room, for instance, by calling home on the phone.

In the embodiment 3, the communication with the portable telephone is added to the processes of the embodiment 1. However, the communication with the portable telephone may be added to the processes of the embodiment 2. That is, when it is decided to be "No" in step S26 of the procedure shown in FIG. 3, in other words, when it is decided that the brightness of the room is not higher than the prescribed illumination level, the message may be transmitted to the portable telephone carried by, for instance, the parent through the communication part 29. As the message at this time, for instance, such a message may be used that children tried to see a television in a dark room, so that the illumination was brightened.

Further, in the above-described embodiment, according to the explanation, the broadcasting signal is the digital broadcasting signal. However, the present invention may be applied to a case that the broadcasting signal is an analog broadcasting signal. In the case of the analog broadcasting signal, the EPG data of a program table superimposed on a broadcasting radio wave is received, or program table data is separately obtained via an internet, so that the information of a received program can be obtained by matching a present time with the program table. Further, in the above-described embodiment, the VCR 17 is exemplified as an image recording and reproducing device. However, it is to be understood that a DVD recorder or an HD incorporated DVD recorder may be employed.

What is claimed is:

1. A broadcasting signal receiving system comprising:
    an obtaining part for obtaining program information of a receiving program;
    a broadcasting signal receiving part for receiving a broadcasting signal to obtain a video signal and an audio signal or a recorded image reproducing part for reproducing a previously recorded program to obtain a video signal and an audio signal;
    an image pick-up part for recording an image of a viewer;
    a certifying part for comparing the image of the face of the viewer recorded by the image pick-up part with the previously registered image of a face of an individual to certify the viewing individual;
    an illumination intensity detecting part for detecting the brightness of a viewing space;
    a control signal transmitting part for transmitting a control signal for controlling the illumination intensity to an illuminating device disposed in the viewing space; and
    a viewing improvement control part for controlling the improvement of viewing on the basis of the certified result by the certifying part, a kind of the receiving program based on the program information and the illumination intensity of the viewing space by the illumination intensity detecting part, wherein when the certified result by the certifying part designates a predetermined child, the kind of the receiving program or the kind of a reproduced program is an animation program and the illumination intensity of the viewing space detected on the basis of the recorded image is not higher than a preset illumination level, the viewing improvement control part controls a warning process to be performed for displaying a message to make the illumination of a room brighter on a monitor screen and the control signal to be transmitted to the illuminating device so as to raise the illumination intensity of the illuminating device to the preset illumination level, and when a sound volume exceeds a preset sound volume level, the viewing improvement control part controls the sound volume to be lowered to the preset sound volume level and a message for making the illumination of the room brighter to be transmitted to a portable telephone through a communication line.

2. A broadcasting signal receiving system comprising:
an obtaining part for obtaining program information of a receiving program;
a broadcasting signal receiving part for receiving a broadcasting signal to obtain a video signal and an audio signal or a recorded image reproducing part for reproducing a previously recorded program to obtain a video signal and an audio signal;
an image pick-up part for recording an image of a viewer;
a certifying part for comparing the image of the face of the viewer recorded by the image pick-up part with the previously registered image of a face of an individual to certify the viewing individual;
an illumination intensity detecting part for detecting the brightness of a viewing space; and
a viewing improvement control part for controlling the improvement of viewing on the basis of the certified result by the certifying part, a kind of the receiving program based on the program information or a kind of a reproduced program and the illumination intensity of the viewing space by the illumination intensity detecting part.

3. The broadcasting signal receiving system according to claim 2, wherein
the image pick-up part serves also as the illumination intensity detecting part.

4. The broadcasting signal receiving system according to claim 2, wherein
when the certified result by the certifying part designates a predetermined child, the kind of the receiving program or the kind of the reproduced program is an animation program and the illumination intensity of the viewing space detected by the illumination intensity detecting part is not higher than a preset illumination level, the viewing improvement control part performs a control of the improvement of viewing.

5. The broadcasting signal receiving system according to claim 2, wherein
the control of the improvement of viewing includes a warning process for displaying a message to make the illumination of a room brighter on a monitor screen.

6. The broadcasting signal receiving system according to claim 4, further comprising
a control signal transmitting part for transmitting a control signal for controlling the illumination intensity to an illuminating device disposed in the viewing space, wherein
as the control of the improvement of viewing, when the illumination intensity of the illuminating device is not higher than a preset illumination level, the viewing improvement control part transmits the control signal to the illuminating device so as to raise the illumination intensity of the illuminating device to the preset illumination level.

7. The broadcasting signal receiving system according to claim 6, wherein
as the control of the improvement of viewing, when a sound volume exceeds a preset sound volume level, the viewing improvement control part controls the sound volume to be lowered to the preset sound volume level.

8. The broadcasting signal receiving system according to claim 4, further comprising
a communication part for performing a unidirectional communication or a bi-directional communication with other electronic devices through a communication line, wherein
as the control of the improvement of viewing, the viewing improvement control part transmits a message for making the illumination of the room brighter to other electronic devices through the communication line.

9. The broadcasting signal receiving system according to claim 8, wherein
other electronic devices include a personal computer, a portable telephone, a PDA or a television receiver disposed in other room of a building.

* * * * *